United States Patent [19]

Sato et al.

[11] Patent Number: 4,898,765

[45] Date of Patent: Feb. 6, 1990

[54] IMPRESSION-PRINTED MOLDED ARTICLE

[75] Inventors: Tsunenobu Sato, Kokubunji; Kiitiro Fukui, Fuji, both of Japan

[73] Assignee: Polyplastics Co., Ltd., Osaka, Japan

[21] Appl. No.: 106,734

[22] Filed: Oct. 8, 1987

[30] Foreign Application Priority Data

Oct. 15, 1986 [JP] Japan ............................ 61-245005

[51] Int. Cl.[4] .......................... B32B 3/00; C08F 8/00; C08L 67/02

[52] U.S. Cl. .................................... 428/195; 525/175; 525/176

[58] Field of Search ................ 400/494, 490; 525/175, 525/176; 428/195

[56] References Cited

U.S. PATENT DOCUMENTS

| | | | |
|---|---|---|---|
| 4,587,155 | 5/1986 | Durand | 400/490 |
| 4,619,971 | 10/1986 | Yates, III et al. | 525/175 |

OTHER PUBLICATIONS

4500679 DuFour 525/175.

*Primary Examiner*—George F. Lesmes
*Assistant Examiner*—D. R. Zirker
*Attorney, Agent, or Firm*—Nixon & Vanderhye

[57] ABSTRACT

An impregnation-printed molded article comprises an article molded of a composition consisting of a thermoplastic polyester resin (A) and, in mixture therewith, a thermoplastic polymer compound (B) containing as a polymer skelton component unit at least one kind of material from the group consisting of butadienes, styrenes, acrylonitriles, and acrylates, said molded article being impregnation-printed.

3 Claims, No Drawings

IMPREGNATION-PRINTED MOLDED ARTICLE

This invention concerns an impregnation-printed molded article comprising an article molded of a composition consisting of a thermoplastic polyester resin (A) and, in mixture therewith, a thermoplastic plastic compound (B) containing as a polymer skeleton component unit at least one kind of material from the group consisting of butadienes, styrenes, acrylonitriles, and acrylates, the molded article being impregnation-printed. Articles molded of such a composition have excellent impregnation printability and can be advantageously used for such applications as keys (and more particularly key tops) for personal computers, word processors, typewriters, electronic calculators, telephone sets, and the like, which have characters, symbols, patterns, etc. impregnation-printed thereon.

PRIOR ART AND ITS PROBLEMS

Recently, it is a general practice to form characters, symbols, patterns on molded article surfaces to give some particular functions to the molded articles.

In such applications of molded articles, and more particularly in those applications which involve very frequent use, such as keys (key tops in particular) for personal computers, word processors, typewriters, electronic calculators, and telephone sets, permanence properties against frictional wear are particularly required to ensure that the character, symbol and the like formed on the molded article surface are prevented from fading or vanishing away. Also, there are often cases where handle comfort (good hand) during use, prompt adaptability for varieties of characters and symbols and for diverse types of equipment, and good economical features are required.

With known printing methods, such as dry offset printing, screen printing, and pad printing, it is impossible to provide prints of characters, symbols, and the like which have good performance properties against frictional wear. With any hot stamping method, or with a method such that a part corresponding to a character or symbol on a molded article is recessed in the mold, which recess is filled with an ink after molding, one difficulty is that a concave and convex pattern is formed on the molded article surface, which is often a source of uncomfortable hand during the use of the molded article. Another difficulty is the lack of adaptability for varieties of characters and symbols, which fact is economically inconvenient. In order to overcome these difficulties, one recent approach is to employ an impregnation printing method such that characters or symbols are printed, with a special ink incorporating a sublimating ink, directly on a molded article by pad printing or screen printing techniques, then the molded article is heat treated so that the sublimating dye in the ink is impregnated and fixed into the molded article interior (direct method). Another approach receiving attention is that characters and/or symbols are printed in aforesaid special ink on a release paper, then the printed release paper is placed on a molded article and heat pressed thereonto so that the dye in the ink is impregnated and fixed into the molded article interior (heat transfer method). Such impregnation printing, which permits the dye to penetrate deep into the resin, can provide good print with excellent wear resistance and good handle comfort during use; further it is adaptable for formation of various different characters and symbols and economical as well. However, such printing is not applicable to all types of resins. Depending upon the type of resin, the dye may not penetrate well into the resin, which fact naturally means poor printing effect and inferior performance against frictional wear. In some uses, the dye may become diffused with the result of blurring and lack of clearness. As a matter of fact, the impregnation printing technique is today employed with only a limited variety of resins, including polyacetals and polybutylene terephthalates. With many other types of resins, such as ABS resin and the like, impregnation printing involves above said problems and, as such, it has not yet been reduced to practical application.

Even with polyacetal and polybutylene terephthalate resins, there is a problem of blurring which arises from heating and improvements are required in this respect. Thus, development has been strongly demanded of resins which allow good ink impregnation and fixing during printing, assure good stability of printed characters and symbols against wear, heat, ultraviolet rays, and other environmental conditions, and yet which have excellent mechanical, physical, and chemical properties.

SUMMARY OF THE INVENTION

The present inventor et al made series of studies into the possibilities of solving these problems in order to produce satisfactory impregnation-printed molded articles, and as a result they found that impregnation printing, with such excellent print effect that had never been achieved, could be made with moldings of a composition consisting of a thermoplastic polyester resin (A) and, in blend therewith, a thermoplastic polymer compound (B) containing as a polymer skeleton unit at least one kind of material from the group consisting of butadienes, styrenes, acrylonitriles, and acrylates, all of which had been considered to be unsuitable for impregnation printing. This finding led to the present invention.

Thermoplastic polyester resins (A) used in the invention are homopolyesters, copolyesters, and the like which are produced through polycondensation of a dicarboxylic acid compound and a dihydroxy compound, or polycondensation of oxycarboxylic compounds, or polycondensation of a tricomponent mixture of them. One kind of such resin may be used alone, or two or more kinds of such resin may be used in mixture. Preferably, polyalkylene terephthalate is used as such. More preferably, polybutylene terephthalate is advantageously use.

In the present invention, the thermoplastic polyester may be one modified through such known technique as crosslinking or graft polymerization.

In the invention, the term "thermoplastic polymer compound (B)" for mixture with the thermoplastic polyester resin (A), which contains as a polymer skeleton unit at least one kind of material from the group consisting of butadienes, styrenes, acrylonitriles, and acrylates, refers to any of such materials as, for example, acrylonitrile-butadiene-styrene (ABS) resin, acrylonitrile-styrene (AS) resin, methylmethacrylate-butadiene-styrene (MBS) resin, ethylene-ethylacrylate (EEA) resin, acrylonitrile-EPDM-styrene (AES) resin, acrylonitrile-styrene-special acrylic rubber (AAS) resin, polymethyl methacrylate (PMMA) resin, and butadiene or acrylonitrile rubber. These resins may be used either singly or in a mixture of two or more kinds, with good effect.

The present invention comprises an article molded of a composition consisting of the aforesaid thermoplastic polyester resin (A) and, in mixture therewith, a specific thermoplastic polymer compound (B), said molded article being impregnation-printed, whereby an excellent impregnation-printed molded article is obtained. The mixture ratio of the two components for production of such molded article is: thermoplastic polyester (A)/specific thermoplastic polymer compound (B)=99~1/1~99 (percent by weight). Preferably, such ratio is 95~10/5~90 (percent by weight), more preferably 90~30/10~70 (percent by weight). More strictly, an optimum value is often found within the range of 80~40/20~60 (percent by weight).

In the present invention, it is possible to further add known additives and/or fillers to the aforesaid composition from which a molded article is formed, to such extent as is reasonably compatible with the impregnation printability of the molded article and according to the purpose for which the molded article is used. For example, any of the following may be added: stabilizers for anti-oxidation and weathering purposes, lubricants, plasticizers, nucleating agents, parting agents, anti-static agents, surface active agents, and the like; glass fibers, metal fibers, potassium titanate, glass flakes, glass heads, micas, talc, wollastonite, calcium carbonate, titanium oxide, alumina, silicon carbide, boron nitride, ceramics, metal powder, and the like inorganic compounds in fibrous, lamellar, granular, and powdery forms.

Methods for preparation of molded articles in the present invention are not particularly limited. Any conventional method may be employed. For example, one method is such that all component materials for construction of a molded article are mixed together and the mixture is melted, kneaded, and extruded by means of an extruder, the mixture being thereby pelletized. Thereafter, the molding operation may be carried out. Another method applicable is such that pellets of different compositions are first prepared and they are mixed and molded into any desired moldings. Another method is such that all component materials are loaded into a molding machine so that moldings of the desired composition are produced.

Impregnation printing techniques employed in the invention are not particularly limited. Any known method may be employed. For example, one method is such that characters, symbols, or the like are printed in a special ink incorporating a sublimating dye directly on the molded article by employing conventional printing techniques, such as pad printing, screen printing, or the like, then heat treatment is effected to permit the dye in the ink to penetrate and become fixed into the molded article interior. Another method is such that characters, symbols, or the like are printed with the aforesaid special ink on a release paper, and then the printed release paper is placed on the molded article and is heat pressed thereonto so that the dye in the ink penetrates and is fixed into the molded part interior.

EXAMPLES

The following examples and comparative examples are given to further illustrate the invention. It is to be understood, however, that the invention is not limited to these examples. In the following examples and comparative examples, impregnation printing and evaluation were carried out respectively according to the following method:

TEST PIECE

Flat plate (50 mm×70 mm×3 mm)

Impregnation Printing Method

Each test piece was degreased by supersonic cleaning in 1,1,1-trichloroethane, then dried.

Then, printing was effected directly on the test piece with an ink of SMX PBT (India ink) F-1/reducer liquid WKLTD (a product of Toyo Ink K.K.) =10/1 and by employing the pad printing technique, and the printed plate was heated and baked at 160° C. for 8 min. (if the resin is melted or softened at that temperature, heating-/baking was effected at a temperature that was 20~30° C. lower than the melting or softening temperature of the resin, for 30~60 min.) so that the ink was penetrated and fixed into the resin. Finally, the surface was cleaned with solvent and then dried.

Evaluation Method

Immediately after each test piece was impregnation-printed, and also after the impregnation-printed test piece was treated for 240 hrs in a thermo-hygrostat of 80° C. and 95% RH, evaluation was made with respect to the following:

Appearance (print clearness, ink blur, and the like)
Visual observation was made by the naked eye and also by a 10X magnifier. Evaluation was made in 10 steps.

Ink Adhesion
Print peel test by cellophane tape, and wipe-off test with solvent.

Print resistance to wear
10,000-time wear test with plastic eraser.

Examples 1~5 AND COMPARATIVE EXAMPLES 1~2

A PBT resin having an inherent viscosity (I.V.) of 0.75 and an ABS resin (a product of Ube Industries, Ltd.: Sicolac GSM) were mixed in each respective ratio shown in Table 1, and the mixture was extruded by a twin-screw extruder into pellets. Test pieces were prepared from these pellets by injection molding and impregnation-printed. The so printed test pieces were respectively evaluated. For comparison, test pieces molded of PBT resin and ABS resin respectively were prepared and evaluated in similar manner.

The results are shown in Table 1. Nothing abnormal was observed with either the examples or the comparative examples in the evaluation of ink adhesion and print resistance to wear.

TABLE 1

| | Example | | | | | Comp. Expl. | |
|---|---|---|---|---|---|---|---|
| | 1 | 2 | 3 | 4 | 5 | 1 | 2 |
| Composition | | | | | | | |
| PBT resin (wt %) | 95 | 90 | 70 | 50 | 30 | 100 | — |
| ABS resin (wt %) | 5 | 10 | 30 | 50 | 70 | — | 100 |
| Evaluation | | | | | | | |
| Appearance just after impreg. printing*1 | 10 | 10 | 10 | 10 | 10 | 10 | 5*3 |
| Appearance | 7~8 | 9 | 10 | 8 | 8 | 7 | 1 |

TABLE 1-continued

| | Example | | | | | Comp. Expl. | |
|---|---|---|---|---|---|---|---|
| | 1 | 2 | 3 | 4 | 5 | 1 | 2 |
| after wet heat treatment*2 | | | | | | | |

*1 Appearance just after impregnation printing according to conventional method (clearness, ink blurring, etc.):

10 ⟷ 1
No ink blur  Severe blur

*2 Appearance after impregnation-printed test piece was treated at 80° C. and 95% RH for 240 hours (clearness, ink blur, etc.):
For evaluation criteria, see footnote *1 above.
*3 Baking conditions in impregnation printing: 80° C., 45 min. (Baking conditions other than *3 above: 160° C., 8 min.)

EXAMPLES 6∼13 AND COMPARATIVE EXAMPLES 3∼7

A PBT resin having an inherent viscosity of 0.75 was mixed with AS resin, MBS resin, EEA resin, AES resin, or PMMA resin. Test pieces were treated and evaluated in same manner as in Examples 1∼5.

Their respective compositions and evaluation results are shown in Table 2.

With either the examples or the comparative examples, nothing abnormal was found in the tests as to ink adhesion and print wear resistance.

EXAMPLES 14∼16 AND COMPARATIVE EXAMPLE 8

PET resin was mixed with ABS resin. Test pieces were evaluated in same way as in Examples 1∼5. For comparison, test pieces composed of PET resin alone (and those of ABS resin alone) were also evaluated in same manner.

Results are shown in Table 3.

With these examples and comparative examples, nothing abnormal was observed in the tests as to ink adhesion and wear resistance.

TABLE 2

| | Comp. Expl. | Example | | Comp. Expl. | Example | | Comp. Expl. | Example | | Comp. Expl. | Expl. | Comp. | Expl. | Comp. Expl. |
|---|---|---|---|---|---|---|---|---|---|---|---|---|---|---|
| | 1 | 6 | 7 | 3 | 8 | 9 | 4 | 10 | 11 | 5 | 12 | 6 | 13 | 7 |
| Composition | | | | | | | | | | | | | | |
| PBT resin (wt %) | 100 | 90 | 70 | | 90 | 70 | | 90 | 70 | | 90 | | 90 | |
| AS resin (wt %) | | 10 | 30 | 100 | | | | | | | | | | |
| MBS resin (wt %) | | | | | 10 | 30 | 100 | | | | | | | |
| AES resin (wt %) | | | | | | | | 10 | 30 | 100 | | | | |
| EEA resin (wt %) | | | | | | | | | | | 10 | 100 | | |
| PMMA resin (wt %) | | | | | | | | | | | | | 10 | 100 |
| Evaluation | | | | | | | | | | | | | | |
| Appearance just after impregnation printing *1 | 10 | 10 | 10 | *3 6 | 10 | 10 | *4 — | 10 | 10 | *3 6 | 10 | *5 — | 10 | *3 3 |
| Appearance after wet heat treatment *2 | 7 | 9 | 10 | 2 | 8 | 10 | — | 8 | 9 | 2 | 8 | — | 8 | 1 |

*1 See Table 1
*2 See Table 1
*3 See Table 1
*4 Hardly moldable
*5 Not impregnation-printable due to low softening point

TABLE 3

| | Comp. Expl. | Example | | | (Comp. Expl. |
|---|---|---|---|---|---|
| | 8 | 14 | 15 | 16 | 2 |
| Composition | | | | | |
| PET resin (wt %) | 100 | 90 | 70 | 50 | 100 |
| ABS resin (wt %) | | 10 | 30 | 50 | |
| Evaluation | | | | | |
| Appearance just after impreg. printing *1 | 10 | 10 | 10 | 10 | 5 *3 |
| Appearance after wet heat treatment *2 | 6 | 7 | 9 | 9 | 1 |

*1 See Table 1
*2 See Table 1
*3 See Table 1

As may be clearly understood from the foregoing examples and comparative examples, by using as a substrate for impregnation printing a molded article of a composition consisting of a thermoplastic polyester resin and, in blend therewith, a thermoplastic polymer compound having as a polymer skeleton unit at least one kind of material selected from the group consisting of butadienes, styrenes, acrylonitriles, and acrylates, all of which have been considered to be unsuitable for being impregnation-printed, it is now possible to obtain an impregnation-printed molded article having improved impregnation printability, much better print clearness, better ink adhesion, remarkably less ink blurring due to heat treatment, and much better performance against frictional wear as compared with articles molded from the individual resins independently.

What is claimed is:

1. A molded article comprising at least one surface which bears an impregnation-printed character and/or symbol consisting essentially of a sublimative dye which is impregnated within and fixed to said at least one surface, wherein said at least one surface consists essentially of a blend of resin components (A) and (B), wherein resin component (A) is a thermoplastic polyester in an amount between 80–40 weight percent, and resin component (B) is at least one thermoplastic resin in an amount between 20–60 weight percent selected from the group consisting of acrylonitrile-butadiene-styrene, acrylonitrile-styrene, methylmethacrylate-butadiene-styrene,ethylene-ethylacrylate, acrylonitrile-EPDM-styrene, acrylonitrile-styrene-special acrylic rubber, polymethyl methacrylate, butadiene rubber and acrylonitrile rubber.

2. A molded article as in claim 1, wherein said resin component (A) is a polyalkylene terephthalate.

3. A molded article as in claim 2, wherein said polyalkylene terephthalate is polybutylene terephthalate.

* * * * *

UNITED STATES PATENT AND TRADEMARK OFFICE
CERTIFICATE OF CORRECTION

PATENT NO. : 4,898,765

DATED : February 6, 1990

INVENTOR(S) : SATO et al

It is certified that error appears in the above-identified patent and that said Letters Patent is hereby corrected as shown below:

Column 1, line 32, after "vanishing" insert a period (.) and delete "away";
line 33, change "handle" to --handling--;
line 47, delete "uncomfortable hand" and insert --discomfort--;
line 53, after "printed" delete the comma (,);
line 55, after "techniques," delete "then" and insert --with--;
line 56, after "article" delete "is" and insert --then being-- and between "heat treated" insert a hyphen (-);
line 60, after "in" insert --the-- and delete "then" and insert --with--;
line 61, after "paper" delete "is" and insert --then being--;
line 67, delete "handle" and insert --handling--.

UNITED STATES PATENT AND TRADEMARK OFFICE
CERTIFICATE OF CORRECTION

PATENT NO. : 4,898,765 Page 2 of 2

DATED : February 6, 1990

INVENTOR(S) : Sato, et al

It is certified that error appears in the above-identified patent and that said Letters Patent is hereby corrected as shown below:

Column 2, line 12, after "involves" delete "above said" and insert --the above-noted--;
line 28, delete "et al" and after "made" insert --a--;
line 31, after "cles" delete the comma (,) and after "and" insert a comma (,) and after "result" insert a comma (,) and delete "they" and insert --has--.

Column 3, line 27, change "heads" to --beads--.

Signed and Sealed this

Twelfth Day of March, 1991

Attest:

HARRY F. MANBECK, JR.

Attesting Officer

Commissioner of Patents and Trademarks